United States Patent Office 2,724,781
Patented Nov. 22, 1955

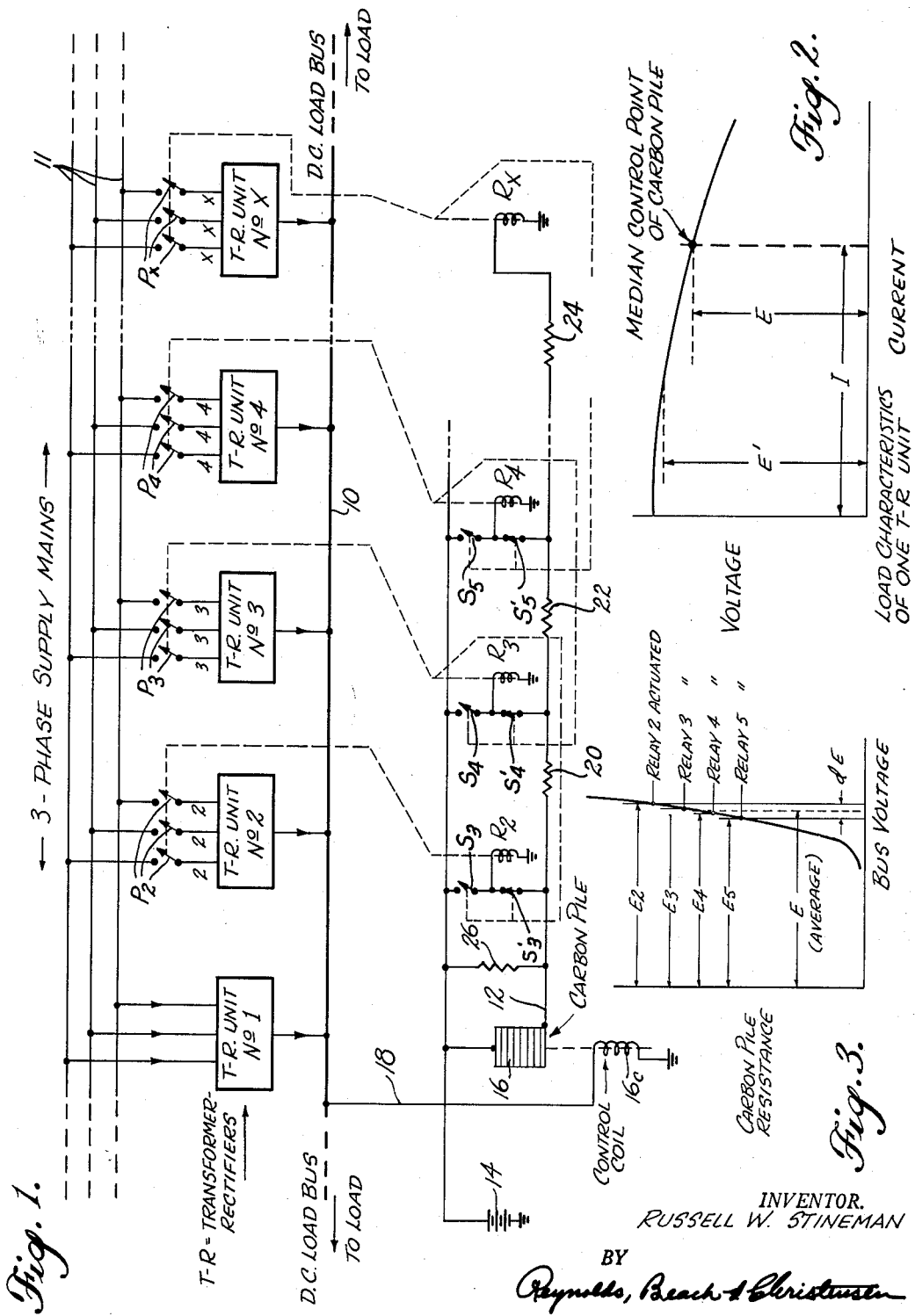

2,724,781

VOLTAGE-REGULATED POWER SUPPLY SYSTEMS

Russell W. Stineman, Seattle, Wash., assignor to Boeing Airplane Company, Seattle, Wash., a corporation of Delaware Application December 9, 1952, Serial No. 324,928

13 Claims. (Cl. 307—112)

This invention relates to voltage-regulating apparatus and is more particularly concerned with the provision of voltage regulation in power supply systems of the type having a plurality of supply units arranged to deliver substantially the same normal voltage and adapted to be connected in parallel to a common load bus and to be disconnected therefrom cumulatively in successive order. The voltage-regulating system herein disclosed operates basically on the principle of compensating for variable voltage drop in the supply source accompanying load current changes by adding and removing individual supply units from operation in cumulative succession. The invention is herein illustratively described by reference to the presently preferred specific form thereof as applied to a specific type of power supply, it being understood that both the particular form and the specific application illustrated herein are described by way of example only, and that they may vary considerably without exceeding the scope of the invention.

Every power supply source, with or without regulating means incorporated therein, will exhibit a sloping voltage characteristic if current continues to increase from a relatively small value. Eventually the voltage drops below a value which may be considered the minimum acceptable value for a particular type of load. However, within a certain range, normally from zero current to a substantial value of current, the voltage usually decreases at a relatively slow rate and for numerous applications this amount of voltage variation may be regarded as negligible.

Thus if the voltage produced by one power supply unit starts to drop below the acceptable minimum and current continues to increase, a second power supply unit may be connected to the load bus in parallel with the first, and with load current then divided between the two units, bus voltage will immediately rise back into the normal operating range. Should load current continue to increase so that bus voltage again starts to drop below the acceptable minimum still a third unit may be connected in parallel with the first two in order to raise the voltage once again. This corrective process may be continued indefinitely by successively adding any desired number of units as current progressively increases. Conversely, as current drops to a value at which it may be supplied at above-minimum voltage with fewer supply units connected in parallel, then one or more of these units may be disconnected from the load bus. Application of this technique in accordance with the invention applies regardless of the type of power supply units employed in such a system and regardless of whether or not such power supply units have individual voltage regulating apparatus incorporated within them.

An object of the invention is an improved voltage-regulated power supply system of that type wherein the number of supply units maintained in operation at any given time is controlled sensitively in accordance with the prevailing load voltage so as to maintain such voltage within acceptable limits.

Still another object is a voltage-regulated power supply system of the type described wherein the failure of any operating supply unit automatically results in its immediate replacement by another, and does not otherwise impair normal regulatory action of the system, except of course to reduce the maximum load capacity thereof by the capacity of the unit which had failed.

A further object of the invention is a system achieving any or all of the foregoing objectives in relatively simple manner, with relatively few and inexpensive parts, and in a manner resulting in reliable operation without a tendency for the control elements to chatter or oscillate and cause fluctuation of system voltage at critical or transition points in the overall load characteristic. In the preferred form herein disclosed, a single sensing amplifier (i. e. a carbon pile resistor in the example) of bus voltage variations serves to control actuation of a plurality of relays in predetermined sequence and, because of compensating provisions, including holding circuits, the last relay in the sequence is controlled by the carbon pile with approximately the same degree of sensitivity as the first relay in the sequence, despite the very sharp resistance characteristic of a carbon pile resistor.

Still another object is such a system which is so arranged and energized as to remain in operation in the event of a bus fault, and to effect delivery of maximum current capable of blowing fuses or circuit limiters, or of clearing the fault from the system instead of rendering the power supply units inoperative as a result of such a condition.

With these and other objects in view as will hereinafter more fully appear, the present invention stated in brief terms employs a supply source including a plurality of units adapted for delivering current to a common load bus, one such unit being normally connected to the bus and the others adapted to be connected to it in parallel with the first. Separate control devices for the individual remaining supply units are provided, with a coordinating circuit for actuating them sequentially, one at a time, as bus voltage repeatedly decreases below a predetermined minimum range of values. The coordinating circuit includes a common energizing or actuating circuit for all the control devices and the actual voltage made available in common for operating the control devices is variably controlled by an amplifier responsive to bus voltage changes. Associated with the individual control devices in the sequence are impedance or inhibiting elements of progressively different values or effect, preventing actuation of any such device until that immediately preceding it in the sequence has first been actuated. Holding means associated with each individual control device and operated by actuation and deactuation of the next succeeding control device in the sequence, respectively, connects and disconnects the former to and from the amplifier circuit, and when disconnected therefrom applies holding voltage to the same in order to maintain the corresponding power supply unit in operation, while relieving the amplifier of cumulative load increase as supply units are being added to the load bus.

In the preferred form the control devices comprise relays and the amplifier means comprises a carbon pile resistor controlled by bus voltage variations and in turn controlling energization of such relays. Energization of the coordinating and energizing circuit for the relays is provided by an independent supply source, affording greater stability against posssible oscillation of relays at critical bus voltages and insuring continued operation of the regulating apparatus to activate additional supply units in the event of a system fault requiring delivery of more and not less load current in order to clear the fault. Secondary contacts in the control relays form the holding circuits for the respectively preceding relays in the sequence. The impedance or inhibiting elements mentioned comprise resistors connected between relays in the common energizing circuit so that their effect becomes cumulative with succeeding relays in the series, yet no individual resistance is large.

These and other features, objects and advantages of the invention will be more fully understood from the following description by reference to the accompanying drawings.

Figure 1 is a schematic diagram illustrating a voltage-regulated power supply system embodying the invention.

Figure 2 is an approximate graph of load voltage versus load current for the type of power supply unit employed.

Figure 3 is an approximate graph of the resistance characteristic of a carbon pile resistor.

The illustrated voltage-regulated power supply is for the purpose of supplying direct voltage to the load bus or conductor 10 and is energized from three-phase supply mains 12 through a variably controlled number of transformer-rectifier units of a conventional type which are illustrated in the diagram simply as blocks designated "T—R unit" and are consecutively numbered 1, 2, 3, 4—X in order to indicate that the number of these units may vary.

It is assumed for purposes of this description of the illustrated form of the invetnion that the alternating voltage of the three-phase supply mains 12 remains substantially constant throughout all variations of load current flowing through the D. C. bus 10. In other words, it is assumed that the T—R units constitute original or primary sources of load current, and that the problem of voltage regulation is attributed solely to curvature of their individual voltage-current characteristics. As the description proceeds, it will be obvious, however, that the control problem is similar in the case of truly independent primary power supply sources, such as motor generator units, batteries, etc., because the important thing, of course, is the voltage actually delivered to the load conductor as a function of load current through the supply channels. The invention is also applicable to regulation of alternating voltage in a manner similar to that illustrated.

It will be noted in Figure 1 that T—R unit No. 1 is continuously or permanently connected between the three-phase supply mains 12 and the D. C. bus 10. Each of the remaining units, however, has normally open switch contacts P2, P3, P4—PX interposed in the three energizing conductors by which these are energized from the three-phase mains. Thus some or all of these remaining units are normally inoperative, or at least are inoperative under an assumed set of conditions. The switch contacts controlling energization and deenergization of these remaining T—R units are incorporated in correspondingly numbered relays R2, R3, R4—RX in the control circuits to be described.

The control circuit relays R2, R3, R4—RX receive energizing current selectively through the common supply conductor 12, connected to an independent source of D. C. control voltage represented by battery 14. An amplifier represented by the carbon pile resistor 16 is interposed in supply conductor 12. The carbon pile control coil 16c is energized by direct current from bus 10 through conductor 18 and varies the resistance value of the carbon pile as a function of bus voltage approximately in the manner illustrated in Figure 3, which is intended to represent the characteristic of a conventional carbon pile having a critical control voltage range corresponding to the desired regulatory range of D. C. bus voltage. It will be noted that the resistance of the carbon pile is virtually infinite at voltages above a predetermined range whereas such resistance drops very steeply to a very low value as control voltage applied to the control coil 16c enters and passes through the critical regulatory range. The approximate average regulated bus voltage, represented by the voltage E in Figure 2, is likewise shown in Figure 3.

Relay R2 is connected for energization through the normally closed contacts S3' of relay R3. Relay R3 is arranged to be energized through the normally closed contacts S4' of relay R4, relay R4 being arranged to receive energizing current through the normally closed contacts S5' of relay R5 (not shown).

The relay current flowing through conductor 12 to relay R2 passes directly through contacts S3', whereas the total of that for relays R3, R4, etc., must first flow through resistor 20. Moreover, the total of current for relays R4—RX must first flow through resistor 22, there being an additional resistor added in series with the other for each additional relay, and connected between that relay and the one immediately preceding it in the series. The last relay RX receives current through all of these resistors in series, including resistor 24 associated directly with RX. As a result of this progressively increased resistance in series with the succeeding relays, when carbon pile resistance progressively decreases into and through its critical range relay R2 will be actuated first, relay R3 second, relay R4 third, etc. Of course by employing the equivalent arrangement of relays requiring progressively different actuating currents, respectively, the same result may be achieved without the use of such resistors.

When load current is small so that T—R unit No. 1 is capable of supplying the full current, T—R units 2, 3, 4, etc. remain disconnected from the three-phase supply mains. Under those conditions the bus voltage is above the value (E2, Figure 3) representing the control point of carbon pile 16 required for actuation of relay R2. When the bus voltage drops to E2 by reason of a load current increase, the resistance of carbon pile 16 will be sufficiently decreased that actuating current flows through relay R2, thereby connecting T—R unit No. 2 to the three-phase supply mains. Thus the load is divided equally between the first two T—R units and the bus voltage rises approximately to the value E' representing the output voltage of a T—R unit at half the rated maximum load current.

Should load current increase further so that the voltage of bus 10 drops below the value E3, somewhat lower than E2 because of the effect of resistor 20, relay R3 will then be actuated, closing the contacts P3 and connecting T—R unit No. 3 to the three-phase supply mains. This successive switching action effected by the several relays continues as long as load current progressively increases and there are additional relays and corresponding T—R units to share the increased load. As a result, D. C. bus voltage is constantly maintained above the desired minimum value throughout progressive increase of load current.

The resistors 20, 22, etc., may have the same resistance value. The value chosen is great enough to insure definite sequential actuation of the relays as bus voltage progressively increases through the critical values E2, E3, E4, etc. illustrated in Figure 3, wherein a system of four relays (five T—R units) is assumed. This resistance value is made no greater than necessary for that purpose, however, for a reason which will be mentioned below. The resistors 20, 22 may be of the required appreciable size and still the spread $dE$ of critical bus voltage values at which the different relays are actuated may be kept relatively small due to the fact that the carbon pile resistance is large relative to those resistances and changes at a very rapid rate in its control range. Consequently relatively close regulation of bus voltage is achieved for this basic type of system.

Each of the relays except the last (RX) in the series has a holding circuit which functions when the particular relay succeeding any such relay is actuated. The terminal of relay R2 is connected to the D. C. control voltage source 14 through the normally open contacts S3 of relay R3, and the terminal of relay R3 is connected to the control voltage terminal through normally open contacts S4 of relay R4, etc. When relay R3 is actuated, contacts S3 are closed thereby, while the normally closed contacts S3' are opened. As a result, relay R2, formerly energized through the carbon pile resistor 16, is now energized through contacts S3 directly from the D. C. control voltage source 14. By the same token when relay R4 is subsequently actuated, contacts S4 close and contacts S4' open so that relay R3 becomes energized through the contacts S4 directly from the D. C. control voltage source 14 instead of through carbon pile resistor 16 and the series resistor 20. The same type of action takes place with the succeeding relays, if any, in the series.

Without such holding circuits removing relays from the carbon pile or common control circuit as the relays succeeding them are actuated, the carbon pile would become a less sensitive control means with the addition of each succeeding relay to its circuit, because the effect of a change in its resistance as it approaches lower values is lessened by the shunting action of actuated relays connected across the coils of relays yet to be actuated. In other words, without the holding circuits, the bus voltage spread $dE$ representing the range of the relay control voltages (Figure 3) would either have to be considerably increased, or the incremental spread between the control voltages of the first two relays, for instance, would be insufficient to insure their definite sequential operation, as against possible simultaneous operation.

During an increase of load current accompanied by a decrease of bus voltage relay R2 is first to be actuated by the voltage of the independent source 14 because R2 has only the resistance of the carbon pile in series with it, while the remaining relays have one or more of the resistors 20, 22, etc., in series with them.

When bus voltage progressively decreases to the point at which relay R2 is actuated because of a sufficient reduction in the resistance of the carbon pile, T—R unit No. 2 is connected to the mains 12 and shares the load equally with T—R unit No. 1. The bus voltage immediately jumps up to the value (E') which corresponds to the half-load voltage of one T—R unit. This sudden jump in the bus voltage correspondingly increases the carbon pile resistance and would return relay R2 to deactuated condition once again if it were not for certain factors inherent in the circuit. First the hold-in current of a relay is much less than its actuating or tripping current; furthermore a resistor 26 is connected across the carbon pile to prevent an excessive decrease of relay current the instant this relay operates and adds T—R unit No. 2 to the system. Thus chattering of relay R2 is prevented and T—R unit No. 2 once energized is permitted to continue in operation during a rise of load current.

When, during a further progressive increase of load current, relay R3 becomes actuated, contacts P3 are closed, adding T—R unit No. 3 to the system for again increasing the bus voltage into the normal operative range. In the same instant contacts S3 are closed while contacts S3' are opened, thereby interrupting carbon pile current in relay R2 and forming a steady holding circuit for this relay directly with the separate D. C. source 14. The attending increase of D. C. bus voltage substantially from the value E to the former value E' causes a sudden corresponding increase of carbon pile resistance, but because of the presence of by-pass resistor 26 relay R3 is not deactuated because of that increase. It remains unresponsive to the sudden increase of bus voltage caused by its own actuation, as relay R2 did before it, and is enabled to do this because relay R2 is now connected in a separate holding circuit so that the voltage drop in resistor 26 which the coil of relay R2 would otherwise produce is avoided, and a correspondingly greater hold-in voltage for relay R3 is available as a result thereof. The resistance 20 is small enough that its presence in series with relay R3 does not prevent the maintenance of holding current in that relay, and to an extent its presence is offset by disconnecting relay R2 from the carbon pile by operation of relay R3. Moreover, the sudden increase of carbon pile resistance accompanying actuation of relay R3 does not affect the relay R2, due to the latter's isolation from the carbon pile afforded by the holding circuit.

Should load current continue to increase (and bus voltage decrease) to the point at which relay R4 is actuated, causing addition of T—R unit No. 4 to the system for raising its voltage once again an independent holding circuit for relay R3 is formed by simultaneous opening of contacts S4' and closure of contacts S4. The last relay RX may finally operate if load current rises sufficiently, and in that event will form a holding circuit for the immediately preceding relay by operation of appropriate contacts associated therewith, as before. In that event and at that instant relay RX will be the only relay receiving energizing current through the carbon pile resistor. As with any of the relays, other than R2, the additional series resistance 20, 22, etc., interposed in series with them does not prevent the maintenance of relay holding current upon relay operation, because such resistances are relatively small and, to an extent, their presence is offset by removal of the preceding relays in the series from the carbon pile circuit. Another compensating factor is that the jump or sudden increase of bus voltage attending the addition of each T—R unit becomes progressively less as the number of units sharing the load increases, so that the carbon pile resistance increase becomes correspondingly less.

Should the load current drop off and load voltage rise sufficiently to increase the resistance of the carbon pile above the value permitting hold-in current to flow in the relay then actuated, such as relay RX, this relay will drop out, disconnecting the corresponding T—R unit from the mains 11 and transferring the next preceding relay from its holding circuit connection over to the carbon pile or common relay energizing circuit, so as to relegate such relay to control by the carbon pile. If the decrease of load current continues, then that relay will eventually drop out and in so doing disconnect its associated T—R unit from the mains 11 and simultaneously transfer the relay next preceding it to carbon pile control.

Thus a sufficient decrease of load current produces a reduction in the number of T—R units operating, thereby minimizing the attendant voltage rise and sparing one or more units from any unnecessary life-depleting operation.

Should one of the T—R units fail, it will automatically be replaced by the next succeeding unit in the series, assuming the same or a greater load exists and that bus voltage therefore drops sufficiently as a result of the loss to actuate the control relay of said succeeding unit. Thus the system inherently provides continuity of operation automatically in the event of failure of any T—R unit. The regulatory action provided by the system which obtains after such a failure is substantially the same as before, and the only effect produced is the inevitable reduction in the total load capacity of the system by the capacity of the unit lost.

In the event of a fault in the main bus or any conductor connected to it, the control system automatically functions in the required manner to clear the fault, if possible, due to the fact that the control relay circuits, including the carbon pile, are energized by a separate source 14. Thus if the bus 10 is grounded, the bus voltage will drop greatly and all T—R units will automatically be switched into operation immediately by their control relays. A heavy flow of current will ensue which will either clear the fault or blow the fuses to the faulted section of bus, as desired, so that normal operation in the entire system, or in the remainder of the system, may be restored as immediately as possible.

From the foregoing description it will be noted that the invention provides an automatic voltage-regulated power supply system of the type comprising a plurality of supply units arranged to be connected and disconnected successively in cumulative manner to and from a main bus by automatic control elements sequentially actuated in accordance with progressive bus voltage changes, and although the control points for the different elements, in terms of bus voltage, must be separated from each other in order to obtain sequential actuation, the use of means such as a carbon pile to amplify bus voltage changes in the control range permits the required separation of values to be practically negligible. Moreover, the provision of holding circuits for the individual control elements (relays) relieves the carbon pile of excessive load insuring sensitive response of all control elements thereto in their proper turn, and also preventing instability or oscillation in the system due to sudden voltage changes caused by the addition and subtraction of supply units from the load bus.

The terminology used in the description has been based on a specific example, however, and it should be understood that the scope of the invention extends to all equivalent forms, arrangements and incorporated components where the novel organizations comprising the invention are present.

I claim as my invention:

1. A voltage-regulated power supply system comprising a common load conductor, a plurality of power supply units including a first such unit normally operatively connected for supplying power to said conductor and a plurality of other such units controllable for such operative connection to said common load conductor, individual control elements sequentially actuatable and deactuatable for operatively connecting and disconnecting said other supply units respectively to and from said load conductor in predetermined successive and reverse successive order, and coordinating means controlled by load conductor voltage including a control circuit having branches arranged respectively for actuating said control elements for connecting said other supply units to said load conductor sequentially as such voltage decreases recurrently through a predetermined critical range respectively during progressive increase of load conductor current, and for deactuating said control elements for disconnecting said supply units from said load conductor in reverse sequence as such voltage increases through predetermined critical values during progressive decrease of load conductor current.

2. A voltage-regulated power supply system comprising a common load conductor, a plurality of power supply units including a first such unit normally operatively connected for supplying power to said conductor and a plurality of other such units arranged for operative connection similarly to said common load conductor, a plurality of control relays sequentially actuatable for operatively connecting said other units respectively to said load conductor, and relay energizing means controlled by voltage of said load conductor, effecting successive actuation of said relays for connecting said other units sequentially to said load conductor as load conductor current progressively increases and such voltage decreases repeatedly through a predetermined range of values, respectively, said relay energizing means including a common energizing circuit for said relays having therein impedance means limiting the energizing current through said other relays respectively at lower values relative to their actuating current values than the respective precedingly actuated relays in the sequence, during progressive increase of load conductor current, whereby said relays automatically deactuate in reverse successive order as load conductor current progressively decreases thereafter.

3. The supply system defined in claim 2, and amplifier means in the relay energizing circuit responsive to load conductor voltage variations, controlling successive energization of the relays, such energizing circuit having an energy source therefor independent of said load conductor.

4. The supply system defined in claim 2, wherein the relay energizing means comprises carbon pile means including a control coil energizingly connected to the load conductor and a carbon pile resistance element interposed in the common energizing circuit for said relays.

5. The supply system defined in claim 4, wherein the common energizing circuit includes an energy source therefor independent of the load conductor.

6. The supply system defined in claim 5, and relay holding circuit means for the individual relays, operated by actuation of the next succeeding relay in the sequence respectively to disconnect the former relay from the common energizing circuit and simultaneously connect such former relay to the independent energy source, said holding circuit means for each such relay being reversely operated by deactuation of the next succeeding relay in the sequence.

7. The supply system defined in claim 2, and relay holding circuit means for the individual relays, operated by actuation of the next succeeding relay in the sequence respectively to disconnect the former relay from the common energizing circuit and simultaneously apply holding voltage to such former relay, said holding circuit means for each such relay being reversely operated by deactuation of the next succeeding relay in the sequence.

8. A voltage-regulated power supply system comprising a common load conductor, a plurality of power supply units including a first such unit normally operatively connected for supplying power to said conductor and a plurality of other such units arranged for operative connection similarly to said common load conductor, a plurality of control devices sequentially actuatable for operatively connecting said other supply units respectively to said load conductor, coordinating means responsive to load variations, including amplifier means controlled by such variations for actuating said control devices sequentially as load conductor current progressively increases and in reverse sequence as load conductor current progressively decreases, and holding means for the respective control devices, individually controlled by the next succeeding control devices in the sequence respectively and automatically operated for disconnecting any such control device in actuated condition from said amplifier means by actuation of the next succeeding control device while holding the first device actuated independently of said amplifier means, and conversely reconnecting any such actuated control device to said amplifier means by deactuation of the next succeeding control device, whereby both such control devices are then subjected to said amplifier means.

9. A voltage-regulated power supply system comprising a common load conductor, a plurality of power supply units including a first such unit normally operatively connected for supplying power to said conductor and a plurality of other such units arranged for operative connection similarly to said common load conductor, a plurality of normally deactuated control relays sequentially actuatable for operatively connecting said other supply units respectively to said load conductor, relay coordinating means including a common energizing circuit for said relays, amplifier means controlled by load conductor voltage providing variable energization voltage to said common energizing circuit in accordance with variations of said load conductor voltage, and means respectively associated with individual relays establishing the individual relay actuating voltages in said common energizing circuit at progressively different values for effecting sequential actuation thereof in response to progressive increase of load conductor current, a source of relay holding current and holding circuit means for a plurality of said relays, operated by the next succeeding relays in the sequence, respectively, and transferring each of said former relays respectively from said common energizing circuit to said holding current source by actuation of the next succeeding relay in the sequence, and reversely transferring such former relays by deactuation of such latter relays, respectively.

10. The voltage-regulated power supply system defined in claim 9, wherein the amplifier means comprises a carbon pile resistance device having a resistance element interposed in series with the common relay energizing circuit and a control coil energized in accordance with load conductor voltage, and a by-pass resistance connected across said carbon pile resistance element for reducing the decrease of voltage otherwise effected by said carbon pile device in said common relay energizing circuit attending actuation of a relay to connect another power supply unit to the common load conductor.

11. The voltage-regulated power supply system defined in claim 10, wherein the relay actuating-voltage-establishing means comprises a plurality of resistance elements interposed between respectively succeeding relays connected in parallel and having the first relay in the sequence connected to the carbon pile resistance element.

12. The voltage-regulated power supply system defined in claim 11, wherein the source of holding current constitutes the energy source for the common energizing circuit, said source being independent of load conductor voltage.

13. A voltage-regulated power supply system comprising a common load conductor, a plurality of power supply units including a first such unit normally operatively connected for supplying power to said conductor and a plurality of other such units arranged for operative connection similarly to said common load conductor, a plurality of normally deactuated control relays sequentially actuatable for operatively connecting said other supply units respectively to said load conductor, relay coordinating means including a common energizing circuit for said relays, amplifier means controlled by load conductor voltage providing variable energization voltage to said common energizing circuit in accordance with variations of said load conductor voltage, and means respectively associated with individual relays establishing the individual relay actuating voltages in said common energizing circuit at progressively different values for effecting sequential actuation thereof in response to progressive increase of load conductor current, a source of relay holding current and holding circuit means for a plurality of said relays, operated by the next succeeding relays in the sequence, respectively, and transferring each of said former relays respectively from said common energizing circuit to said holding current source by actuation of the next succeeding relay in the sequence, and reversely transferring such former relays by deactuation of such latter relays, respectively, said holding current source providing energy for said common relay energizing circuit and being independent of load conductor voltage.

References Cited in the file of this patent

UNITED STATES PATENTS

| | | |
|---|---|---|
| 1,007,480 | North et al. | Oct. 31, 1911 |
| 2,088,474 | Haller | July 27, 1937 |